(12) United States Patent
Co et al.

(10) Patent No.: US 7,680,661 B2
(45) Date of Patent: Mar. 16, 2010

(54) METHOD AND SYSTEM FOR IMPROVED SPEECH RECOGNITION

(75) Inventors: Raymond L. Co, Willowdale (CA); Ea-Ee Jan, Ardsley, NY (US); David M. Lubensky, Brookfield, CT (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 12/120,316

(22) Filed: May 14, 2008

(65) Prior Publication Data

US 2009/0287483 A1 Nov. 19, 2009

(51) Int. Cl.
*G10L 15/00* (2006.01)
(52) U.S. Cl. .................. 704/251; 704/252; 704/257; 379/88.01
(58) Field of Classification Search .................. 704/251, 704/252, 257; 379/88.01
See application file for complete search history.

(56) References Cited

U.S. PATENT DOCUMENTS

| | | | |
|---|---|---|---|
| 6,185,530 B1 * | 2/2001 | Ittycheriah et al. .......... | 704/255 |
| 6,925,154 B2 * | 8/2005 | Gao et al. ................. | 379/88.03 |
| 7,231,343 B1 * | 6/2007 | Treadgold et al. ............... | 704/9 |
| 2004/0260543 A1 * | 12/2004 | Horowitz et al. ............ | 704/221 |
| 2006/0143007 A1 * | 6/2006 | Koh et al. ................... | 704/243 |
| 2008/0071534 A1 | 3/2008 | Johnson | |
| 2008/0126091 A1 * | 5/2008 | Clark et al. ................. | 704/246 |
| 2008/0243514 A1 * | 10/2008 | Gopinath et al. ............ | 704/270 |

FOREIGN PATENT DOCUMENTS

| EP | 1424844 A1 | 2/2004 |
|---|---|---|
| EP | 1424844 A1 * | 6/2004 |

* cited by examiner

*Primary Examiner*—Daniel D Abebe
(74) *Attorney, Agent, or Firm*—Wolf, Greenfield & Sacks, P.C.

(57) ABSTRACT

A method for speech recognition includes: prompting a user with a first query to input speech into a speech recognition engine; determining if the inputted speech is correctly recognized; wherein in the event the inputted speech is correctly recognized proceeding to a new task; wherein in the event the inputted speech is not correctly recognized, prompting the user repeatedly with the first query to input speech into the speech recognition engine, and determining if the inputted speech is correctly recognized until a predefined limit on repetitions has been met; wherein in the event the predefined limit has been met without correctly recognizing the inputted user speech, prompting speech input from the user with a secondary query for redundant information; and cross-referencing the user's n-best result from the first query with the n-best result from the second query to obtain a top hypothesis.

6 Claims, 3 Drawing Sheets

METHOD AND SYSTEM FOR IMPROVED SPEECH RECOGNITION

BACKGROUND OF THE INVENTION

1. Field of the Invention

The present invention relates generally to speech recognition and, more particularly, to a method, article, and system for improved speech recognition utilizing redundant information.

2. Description of the Related Art

Speech recognition (also known as automatic speech recognition or computer speech recognition) converts spoken words to machine-readable input (for example, to binary code for a string of character codes). The term "voice recognition" may also be used to refer to speech recognition, but more precisely refers to speaker recognition, which attempts to identify the person speaking, as opposed to what is being said. Speech recognition applications include voice dialing (e.g., "Call home"), call routing (e.g., "I would like to make a collect call"), appliance control, content-based spoken audio search (e.g., find a podcast where particular words were spoken), simple data entry (e.g., entering a credit card number), preparation of structured documents (e.g., a radiology report), speech-to-text processing (e.g., word processors or emails), and in aircraft cockpits (usually termed Direct Voice Input).

Speech pattern matching involves the matching of characteristic parameters extracted from an incoming test speech signal with those of a collection of pre-recorded reference speech templates. Keyword spotting, speech recognition, and speaker detection are typical tasks that employ speech pattern matching techniques for recognition or detection purposes. In keyword spotting and speech recognition tasks, the test speech sample and reference speech templates are uttered words, while speaker detection uses several seconds of individuals' voices In an automated conversational user interface (UI), speech recognition is employed to recognize information from large lists or databases such as a caller's telephone number, account number, their name, address, and zip code, etc. Speech recognition performance and the resulting user experience and levels of user satisfaction are critical driving factors to the successful deployment of automated conversational UI systems.

SUMMARY OF THE INVENTION

A method for improved speech recognition utilizing redundant information, the method includes: prompting a user with a first query to input speech into a speech recognition engine; receiving the user's inputted speech; determining if the inputted speech is correctly recognized by the speech recognition engine; wherein in the event the inputted speech is correctly recognized proceeding to a new task; wherein in the event the inputted speech is not correctly recognized, prompting the user repeatedly with the first query to input speech into the speech recognition engine, and determining if the inputted speech is correctly recognized until a predefined limit on repetitions has been met; wherein in the event the predefined limit has been met without correctly recognizing the inputted user speech, prompting speech input from the user with a secondary query for redundant information; cross-referencing the user's n-best result from the first query with the n-best result from the second query to obtain a top hypothesis; and wherein in the event the top hypothesis is incorrect the user is transferred to a human agent.

TECHNICAL EFFECTS

As a result of the summarized invention, a solution is technically achieved for a method, article, and system for improved speech recognition utilizing redundant information.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
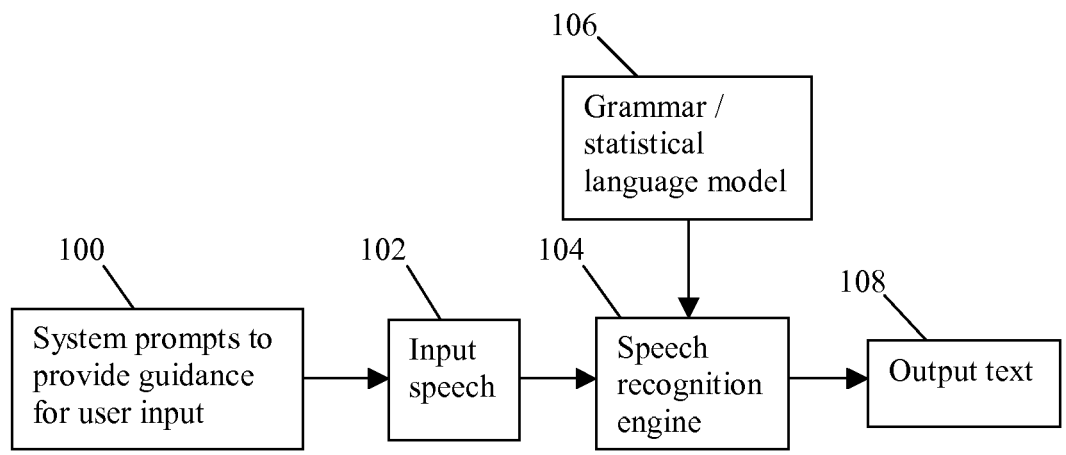
FIG. 1 is a functional block diagram for carrying out embodiments of the invention.

The detailed description explains the preferred embodiments of the invention, together with advantages and features, by way of example with reference to the drawings.

DETAILED DESCRIPTION

Conventional automated conversational UI speech recognition for matching information contained in a database table or list (e.g., telephone numbers, account numbers, people's name, zip codes, etc.) employ the following method. A System requests information, such as a serial number from a user (caller), and the system confirms the user's input. In the event the system makes a speech recognition error, the system performs a second and perhaps a third or more requests for the user's serial number. When a maximum number of speech recognition failures are reached, the system transfers the caller to a live customer service representative. The following is an example of an interaction between a caller a conventional automated conversational UI speech recognition system, where the system continuously is unable to differentiate the letter 'A' from the number '8' in the user's input speech.

System: please say your serial number

User: 1 A 1 2 8 4

System: did you say "1 8 1 2 8 4"

User: no

System: My mistake. Please say your serial number one more time, please.

User: 1 A 1 2 8 4

System: did you say: 1 A 1 2 A 4

User: no

System: I am really sorry. Let me transfer you the customer service agent . . . .

The previous example approach for the conventional automated conversational UI speech recognition system is rather simple and easy to implement. However, excluding a situation where a user (caller) makes the first mistake, in the event a system makes a first false acceptance of inputted information, the system generally again makes a higher than average acceptable false acceptance rate in the second and the third trials. In addition, as a voice recognition system struggles to comprehend a user's input over multiple trails, the user begins to become annoyed or agitated. A rising level of user's annoyance or agitation typically degrades the user's voice quality, which further degrades the speech recognition system's accuracy, and adversely affects the user's interactive experience with the speech recognition system.

In a second example of a conventional automatic conversational UI speech recognition application involves a package tracking system, where the package tracking numbers have a check-sum for verification. The tracking system may use a n-best result from the speech recognition, where the system selects the first result that fulfils the check-sum rule designated by the system as a legitimate speech inputted tracking number. It is noted, that speech recognition performance has been improved substantially with the check-sum approach. For example, the present inventor's experiments using the check-sum approach have reduced the false acceptance rate of 18 alpha-numeric strings from 30% to 10%. However, for zip codes, telephone number, and the majority of listing (database) recognition applications, a check sum is not available or is not applicable, which defeats this approach.

An additional automated conversational UI speech recognition approach is to ask a user for both their serial number and their name. In further examples, for a zip code application, the speech recognition system may request both zip code and city name information, for an account number application, both an account number and an account name may be requested from the user. By joining n-best results from these two queries, the speech recognition system performance may be improved. Although the accuracy performance is better than the conventional approach, where the speech recognition system only requests a user's serial number, zip code, or account number, the user experience may be severely degraded due to the speech recognition system's requesting redundant information.

Embodiments of the invention provide a means to improve the performance of automated conversational UI speech recognition by cross-referencing information available in lookup tables of databases, using n-best results from additional queries of redundant information in semantic space. For example, although check sum information is not available for the zip code, telephone number, serial number recognition scenarios presented above, additional redundant information is generally available to verify an n-best result, and improve overall automated conversational UI speech recognition.

Embodiments of the invention, for example, utilizing that an associated user's name is known for a given serial number, the intersection of n-best results from both serial number and name is used to obtain an improved result for serial number recognition. In an additional example, for a given zip code, the associated city name is generally known, therefore for a zip code, embodiments of the invention may intersect n-best results from both zip code and city name, for obtaining better zip code recognition. It is noted that for a typical Canadian zip code application, the present inventors achieved at 25% of relative performance improvement in laboratory study; the error rate was reduced from 20% to 15% by the cross-reference of n-best results using the redundant information.

However, as previously noted, if a system always requests redundant information, a user's experience of the speech recognition system will be degraded. For example, for Canadian zip code, the system is generally able to achieve speech recognition in 75%-80% of instances. Therefore there is really no reason to ask for city name information for these zip code recognition instances. Thus, to further improve customer satisfaction, embodiments of the invention may only request redundant information when necessary; when the system makes a false acceptance mistake. In this approach both system performance and user satisfaction and experience is optimized over conventional approaches.

When a user first interacts with an embodiment of the invention, the embodiment may ask the user to say their voice query (e.g., the postal code, in postal code recognition application). In the event the embodiment reaches a preset maximum number of false accept errors, the system of the embodiment may ask redundant information (e.g., city and state names). The system of the embodiment may then take the n-best results from both primary information and redundant information to perform intersection operations on these n-best results pairs. During performance of the intersection of n-best results, if the interlock information is stored in database, a database query is necessary. If the interlock information is encoded in grammar as a semantic tag (which leads to a larger grammar size), a post-processing of these semantic tags is required. In embodiments of the invention, the intersection or cross-reference of n-best results may yield another n-best result. The system embodiments may interact with the user using the best, the second best then the third best recognized speech matches in a ranked order.

In general, the performance of speech-enabled applications is degraded when grammar or vocabulary size is large. For a large or extensive lookup table recognition task, embodiments of the invention first ask a user to provide voice input, which is similar to conventional approaches. If the voice query is correctly recognized, embodiments of the invention move on to a next step or task. If the query is rejected (no-match), or no query response is provided (no-input), the system asks the user to provide the same input again. In the event the system mistakenly recognizes a voice input (false accept), embodiments of the invention start to consider asking a redundant question. For example, for a zip code application, embodiments of the invention may ask the user for a city name. Embodiments of the invention may have a preset threshold of maximum false accept tolerance before the system begins to ask the user for redundant information. In addition, embodiments of the invention may request the user to provide more than one type of redundant information, in order to further improve speech recognition performance. For example, in a zip code application, the redundant information may include both city and state. For an account number application, the redundant information may be name, telephone number, and address, etc. In the event embodiments of the invention are unable to obtain a correct answer using a first set of redundant information, after a preset maximum number trails, embodiments of the invention may request one or more additional sets of redundant information. Subsequently, if the system cannot recognize the user's intent after numerous trials, which exceeds a preset maximum number of false accept trails, or exceeds a maximum number of redundant queries, embodiments of the invention transfer the call to a human agent.

Embodiments of the invention utilize the n-best results from an original query (zip code, or account information) that cross-reference or intersect with n-best results from a redundant query to obtain a top hypothesis (legitimate result). Embodiments of the invention may use any typical join n-best algorithm. For example, best join scores, weighted join scores, fusion scores, etc. may be utilized. To further improve speech recognition performance, embodiments of the invention may exclude previous false accept answers in the legitimate results. Thus, previous false accept answers will never be offered as answers again.

FIG. 1 is a functional block diagram for carrying out embodiments of the invention. The UI of a automated conversational speech recognition system prompts a user for voice supplied input (block 100), and the user provides inputted speech (block 102) to a speech recognition engine (block 104) that has been pre-loaded with grammar/statistical language models (block 106). The speech recognition engine (block 104) recognizes the speech and outputs text (block 108).

Figure 2:
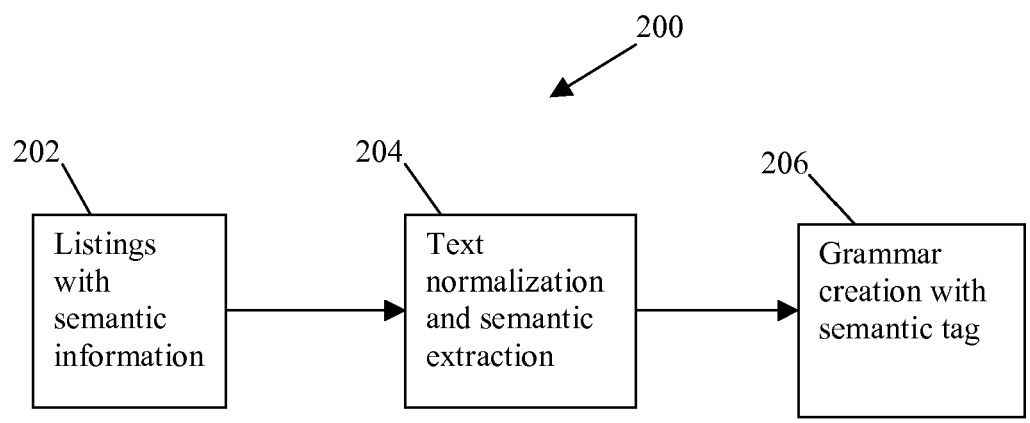
FIG. 2 is a grammar builder for developing recognition grammar employed for carrying out recognition tasks in large database lookup tables according to embodiments of the invention.

FIG. 2 is a grammar/statistical language model builder 200 for developing recognition grammar employed for carrying out recognition tasks in large database lookup tables according to embodiments of the invention. The speech recognition grammar/statistical language models are developed with existing main listings that are required to be recognized by the application that is being carried out (block 202). For example, the listing may be an account number, postal code, or serial number. The auxiliary grammar/statistic language models are developed using the redundant information. For example, for employee serial number, the redundant information may be a first name and/or last name, department name, etc. For a postal code, the redundant information may be a city and/or state name. The semantic tag to interlock main information and redundant information may either be stored in a database or encoded in the grammars. The listing/database (block 202), for the application usually requires clean-up and text normalization (block 204). For example, St. Peter St. means Saint Peter Street. Better speech recognition performance will be achieved by text clean-up/normalization. To cross-reference the redundant information, block 204 generates semantic tag information to interlock the main grammar and redundant information grammar. Block 206 is a module to output the grammars with correct syntax into computer files.

Figure 3:
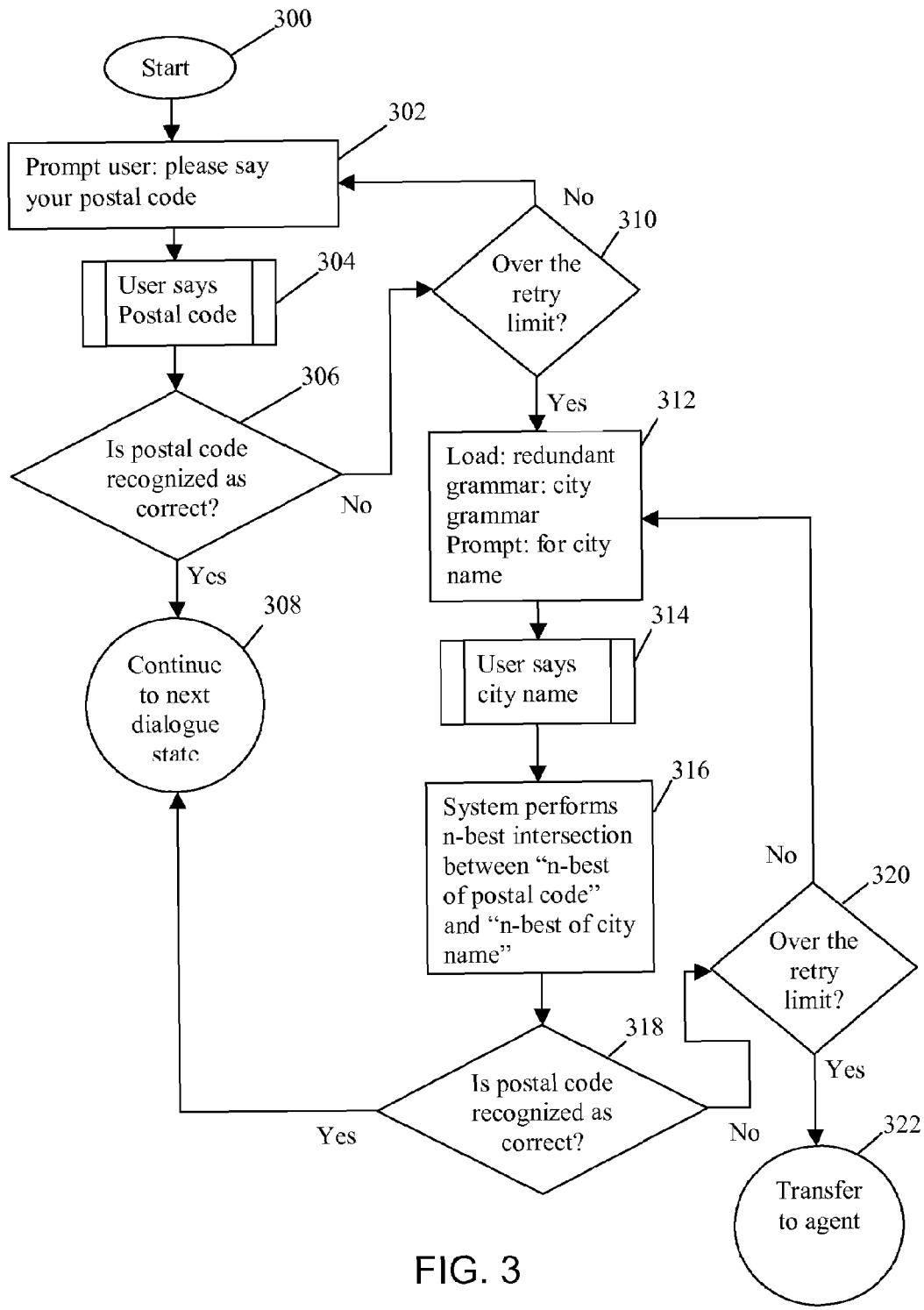
FIG. 3 is a flow diagram illustrating the use of a postal code and city name for redundant information in embodiments of the invention.

FIG. 3 is a flow diagram illustrating the use of a postal code in embodiments of the invention. The main grammar is postal code grammar. The city name is the redundant information. The city grammar will be developed and used as redundant grammar. The process starts (block 300) by prompting the user to say their postal code (block 302). Upon the user saying their postal code (block 304), a determination is made if the postal code is recognized as correct (decision block 306). If the postal code is determined to be correct (decision block 306 is Yes), the next dialogue state is initiated (block 308). In the event the postal code is not recognized as correct (decision block 306 is No), and the retry limit has not been exceeded (decision block 310 is No), the user is prompted to repeat their postal code (block 302). In the event the postal code is again not recognized as correct (decision block 306 is No), and the retry limit has now been exceeded (decision block 310 is Yes), redundant city grammar is loaded into the speech recognition engine, and the user is prompted for a city name (block 312). Upon the user saying their city name (block 314), a n-best intersection between "n-best of postal code" and "n-best of city name" is made (block 316). In the event the postal code is now recognized as correct (decision block 318 is Yes), the next dialogue state is initiated (block 308). However, in the event the postal code is still not recognized as correct (decision block 318 is No), and the over limit for retrying has not been exceeded (decision block 320 is No), the user is prompted again for a city name (block 312). Upon the user saying their city name (block 314), a n-best intersection between "n-best of postal code" and "n-best of city name" is made (block 316). If, however, the over limit for retrying with speech recognition has been exceeded (decision block 320 is Yes), the user is transferred to a live agent (block 322) for assistance.

Figure 4:
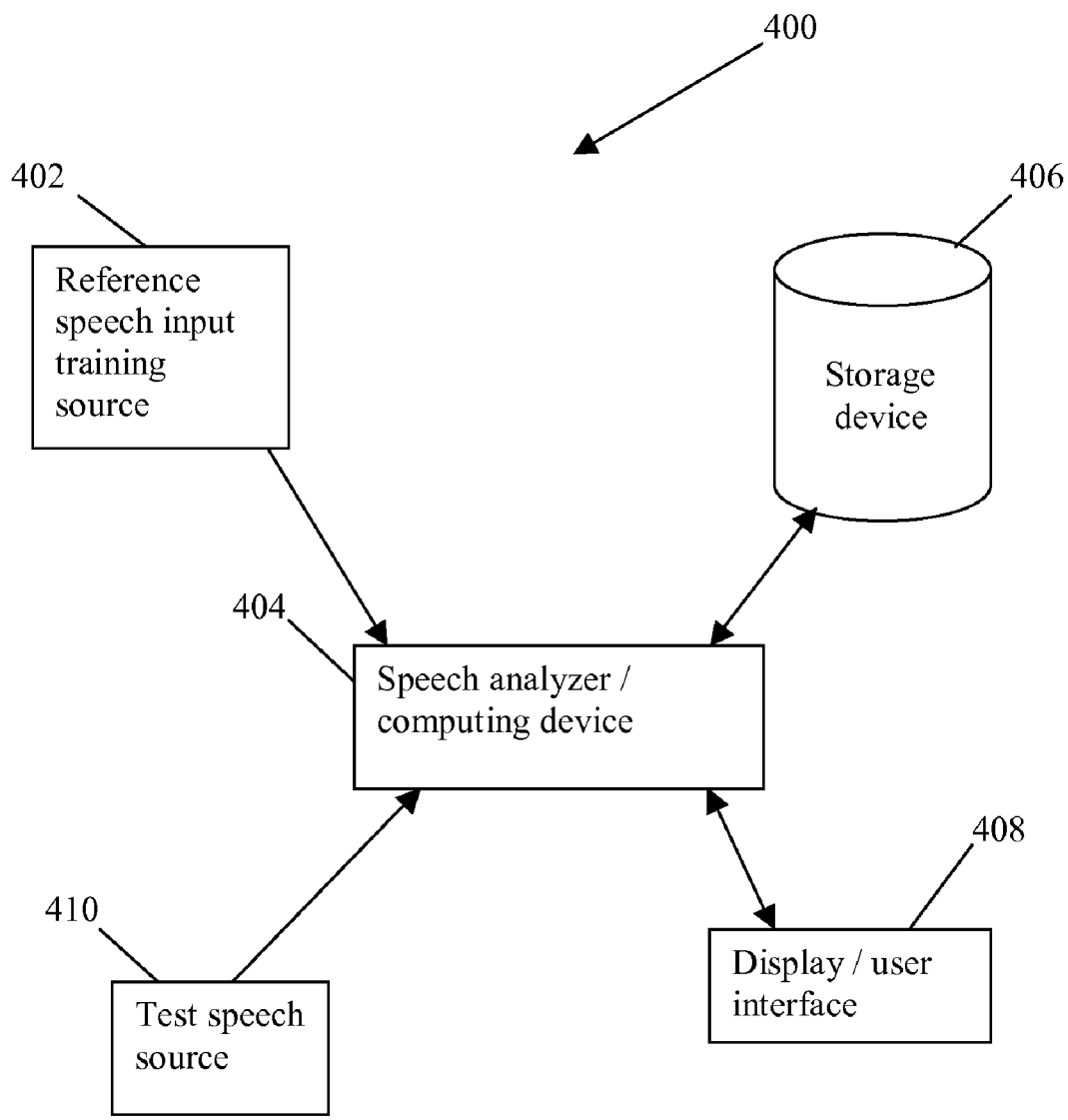
FIG. 4 is a block diagram of an exemplary system for implementing embodiments of the invention.

FIG. 4 illustrates an exemplary system 400 for carryout speech recognition with redundant information according to embodiments of the invention. The system 400 includes a speech analyzer/computing device 404 in electrical communication with a reference speech input training source 402, a storage device 406, a display/input user interface 408, and a test speech source 410. The speech analyzer/computing device 404 records inputs from the reference speech input training source 402 and the test speech source 410, and stores the speech inputs (402, 410) in the storage device 406. The storage device 406 also contains the redundant information databases. The display/input user interface 408 provides speech analysis results, and is configured with a graphical user interface (GUI) for user adjustments and interaction.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for improved speech recognition utilizing redundant information, the method comprising:

prompting a user with a first query for first information as input speech into a speech recognition engine;

receiving the user's inputted speech with the first information;

determining if the inputted speech with the first information is correctly recognized by the speech recognition engine;

wherein in the event the first information from the inputted speech is correctly recognized proceeding to a new task;

in response to a determination that the first information is not correctly recognized, prompting speech input from the user with a secondary query for secondary information;

wherein the secondary information can be used to identify the first information;

cross-referencing the user's n-best result from the first query with the n-best result from the second query to obtain a top hypothesis; and wherein in the event the top hypothesis is incorrect the user is transferred to a human agent.

2. The method of claim 1, wherein based on the cross-referencing the user is provided recognized speech matches to the first query in ranked order.

3. The method of claim 1, wherein the cross-referencing is carried out with a join n-best algorithm; and wherein the join n-best algorithm comprises at least one of the following: best join scores, weighted join scores, or fusion scores.

4. The method of claim 1, wherein in the event the top hypothesis is incorrect the method further comprises:

querying the user for one or more additional pieces of secondary information;

generating a new top hypothesis by cross-referencing a set of n-best results from the additional secondary queries; and wherein in the event the number of secondary queries reaches a preset maximum number of queries, without correctly recognizing the user's inputted speech, the user is transferred to a human agent.

5. The method of claim 1, wherein:

in the event the inputted speech for the first information is not correctly recognized, prompting the user repeatedly with the first query to input speech for the first information into the speech recognition engine, and determining if the inputted speech with the first information is correctly recognized until a predefined limit on repetitions has been met; and in the event the predefined limit has been met without correctly recognizing the first information from the inputted user speech, then prompting speech input from the user with a secondary query for secondary information.

6. The method of claim 5, wherein the method further comprises repeatedly asking the second query until at least one of the following occurs: the secondary information is correctly recognized, a preset threshold of a false accept tolerance is exceeded, and a preset threshold of maximum number of secondary queries is exceeded.

* * * * *